P. F. SHIVERS.
MOTOR OPERATED CONTROL APPARATUS.
APPLICATION FILED JULY 26, 1920.
1,431,738.
Patented Oct. 10, 1922.
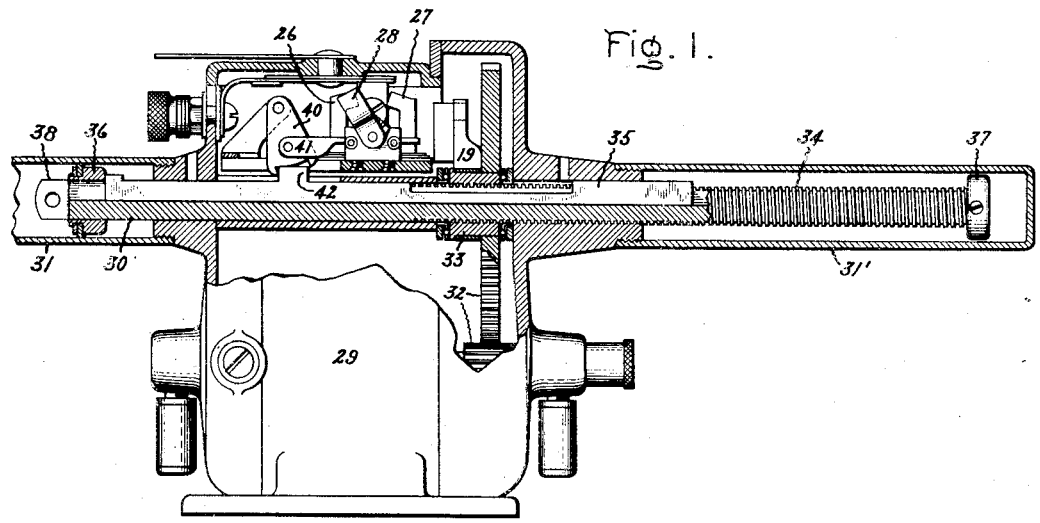
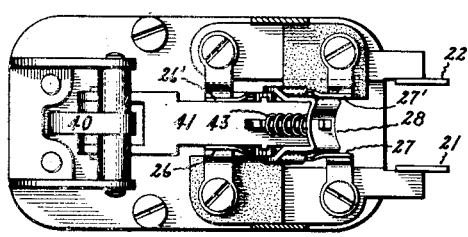
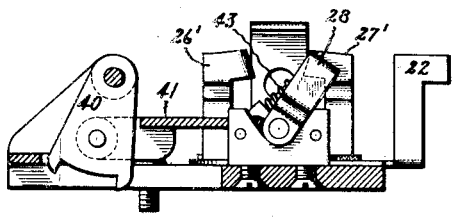
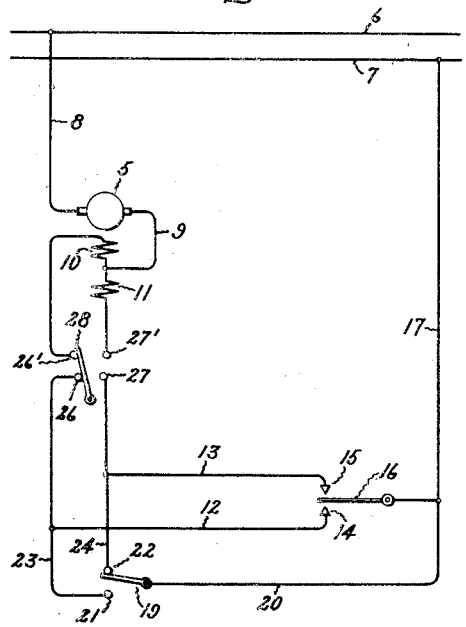
Inventor
Paul F. Shivers,
by Albert G. Davis
His Attorney Patented Oct. 10, 1922.

1,431,738

UNITED STATES PATENT OFFICE.

PAUL F. SHIVERS, OF LUDINGTON, MICHIGAN, ASSIGNOR TO GENERAL ELECTRIC COMPANY, A CORPORATION OF NEW YORK.

MOTOR-OPERATED CONTROL APPARATUS.

Application filed July 26, 1920. Serial No. 399,088.

*To all whom it may concern:*

Be it known that I, PAUL F. SHIVERS, a citizen of the United States, residing at Ludington, in the county of Mason, State of Michigan, have invented certain new and useful Improvements in Motor-Operated Control Apparatus, of which the following is a specification.

The present invention relates to a motor operated control apparatus which is particularly adapted for operation with a master switch automatically moved between predetermined limits, such as a thermostat, for the control of dampers or similar mechanism.

It is the object of my invention to provide a rugged, compact positively operating apparatus which is adapted to provide a desired regulation by reversibly operating an electric motor for a predetermined number of revolutions and then deenergizing said motor. My apparatus is provided with means for mechanically closing a circuit in parallel with the master switch or thermostat contacts by the movement of the motor and is also provided with mechanically operated means for opening the motor circuit upon the completion of a predetermined travel of the motor. The novel features of my invention will be pointed out with greater particularity in the appended claims.

In the accompanying drawings, Fig. 1 is a vertical sectional view of an apparatus embodying my invention; Fig. 2 is a diagram of circuit connections of the apparatus shown in Fig. 1; and Figs. 3 and 4 are detail views of suitable switching apparatus operated by the motor.

The armature 5 of the electric motor, as shown in Fig. 2, receives energy from electric supply main 6, 7. The supply main 6 is connected to one terminal of the motor armature 5 by a conductor 8 and the opposite terminal of the armature being connected by a conductor 9 to the common connection of the split field windings 10, 11. The motor circuit is completed from these field windings through conductors 12, 13, respectively, to the stationary contacts 14, 15 of a thermostatic master switch. The movable blade 16 of the thermostat which is adapted to engage alternately by change of temperature with stationary contacts 14, 15, is connected by a conductor 17 to the supply main 7.

A switch 19 is connected by a conductor 20 to the thermostat switch 16, and is adapted to engage with contacts 21, 22, which are connected respectively by conductors 23, 24, to the motor circuits 12, 13. The switch 19, as will be presently described, is mechanically operated by the motor so that when the motor is energized by the closure of the thermostat, the switch 19 will be immediately moved to complete the circuit in parallel with the thermostat contact. For example, when the thermostat contact 14 is closed the first movement of the motor will shift the switch 19 against contact 21, thereby relieving thermostat contact 14 of most of the motor current.

Paired contacts 26, 26' and 27, 27' are located respectively in the motor circuits 12, 13 and the pole piece 28 is arranged to bridge either of these pairs of contacts. This pole piece 28 is operated by movement of the motor so that at the end of a predetermined travel of the motor the pole piece 28 will be carried away from the contacts through which the motor current is passing and moved into engagement with contacts in the motor circuit through which the motor will be operated in a reverse direction. The result of this movement will be to open the motor circuit and place the reverse circuit in readiness to receive motor current.

As shown in Fig. 1, the electric motor is located within the housing 29 and is connected to a rod 30 arranged to reciprocate within outwardly extending tubes 31, 31' by speed reducing gears 32 connected to a geared nut 33 meshing with a worm gear 34 on the outside of rod 30. The rod 30 is provided with a longitudinal slot in which moves a blade 35 adapted to engage with the collars 36, 37, on the opposite ends of the rod 30. The rod 30 is mechanically connected by a mechanical link 38 to the damper or other element which is to be regulated.

The movable blade 19, as shown in Fig. 1, is in frictional engagement with the gear 32 so that by the rotation of the gear 32 in either direction the blade 19 is moved into immediate engagement with the contacts 21 or 22 as the case may be and is thereafter pressed into engagement with this contact by continued rotation of the motor in the given direction. The position of the contacts 21, 22 is shown in Figs. 3 and 4.

As the motor rotates in the position shown in Fig. 1, it moves the rod 30 to the left, the blade 35 sliding within the slot in the rod 30 until the collar 37 comes in contact with the end of the blade 35 causing it to trip the pole piece 28 and open the motor circuit, as described in connection with Fig. 2. This pole piece 28 is of the usual construction and is connected with a notched rocker arm 40 by a link 41. The rocker arm 40 engages with a lug 42 on the blade 35. By a movement to the left the lug 42 causes the pole piece 28 to leave the contacts 26, 26', and move into engagement with the contacts 27, 27'. By the well known over-center connection of the pole piece 28 with a spring 43 the movement of the pole piece occurs by a quick or snap action. The resulting position of the rocker arm 40 and the pole piece 28 is shown in Fig. 4.

After this switching operation which opens the motor circuit, the motor continues to coast for a short period and then stops.

When the thermostat causes its contact to energize the motor to rotate in the opposite direction, the switch blade 19 will engage with the contact 22 causing the electric motor to rotate so as to slide the rod 30 to the right. The collar 36 then bumps against the blade 35 and eventually moves the lug 42 into engagement with the rocker 40 to reverse the pole piece 28, as already described.

What I claim as new and desire to secure by Letters Patent of the United States, is:—

1. A control system comprising an electric motor, a plurality of circuits arranged respectively to energize said motor to rotate in opposite directions, contacts in each of said circuits, a master switch movable between predetermined limits and connected to alternately energize said motor circuits at its limits, means operated by the movement of said motor to parallel the contacts made by said master switch, and a switch actuated at the end of a predetermined travel of said motor to open one of said contacts in the motor circuit energized by said master switch and close another of said contacts in the circuit which is arranged to operate said motor in a reverse direction when completed by said master switch.

2. A thermostatic control system comprising an electric motor, a mechanical connection between said motor to the element to be regulated, oppositely wound series field circuits for said motor, a thermostat having a movable member arranged to alternately close contacts in said respective field circuits, a switch operated by the motor and arranged to parallel the said thermostat by the first movement of said motor, a second switch adapted to alternately close circuits in the respective field circuits of said motor, and means engaging with the mechanical connection to said motor for operating said second switch upon a predetermined travel of said motor.

3. A thermostatic control system comprising an electric motor, a rod connected to move an element to be regulated, a gear connecting said motor and said rod to longitudinally reciprocate said rod by the rotation of said motor in opposite directions, circuit connections for reversibly energizing said motor, a thermostat arranged to engage with contacts in said respective circuits, a switch blade frictionally engaging with said motor gear to electrically parallel said thermostat contacts by the movement of said motor, a switch adapted to alternately engage with contacts in said motor circuits, and mechanical means actuated by the reciprocation of said rod to shift said switch from the motor circuit energized by said thermostat to the opposite circuit.

4. A regulating apparatus comprising an electric motor, oppositely wound field windings for said motor, a geared rod operatively connected to said motor, circuits respectively in series with field windings for reversibly operating said motor, a thermostat having contacts for energizing said circuits alternately, circuits adapted to be connected in parallel to said thermostat contacts and containing a movable element, means operated by said motor for actuating said movable element to close a circuit in parallel to a thermostat contact, a switch adapted to open one of said field circuits and close the reverse wound circuit, a blade carried by the said rod and having means for operating said switch, and collars on said geared rod engaging with said blade thereby open-circuiting said motor and reversing connections in readiness for the next operation of said thermostat.

In witness whereof, I have hereunto set my hand this 19th day of July 1920.

PAUL F. SHIVERS.